United States Patent [19]

Hattori

[11] 4,264,078
[45] Apr. 28, 1981

[54] PICKUP ARM

[75] Inventor: Tomohuku Hattori, Yokohama, Japan

[73] Assignee: K.K. Koshin Denki Seisakusho, Tokyo, Japan

[21] Appl. No.: 20,060

[22] Filed: Mar. 13, 1979

Related U.S. Application Data

[63] Continuation-in-part of Ser. No. 932,616, Aug. 10, 1978, abandoned.

[30] Foreign Application Priority Data

Aug. 18, 1977 [JP] Japan .................................. 52/99052
Jan. 20, 1978 [JP] Japan .................................. 53/05685

[51] Int. Cl.³ ............................................. G11B 3/10
[52] U.S. Cl. ................................. 369/242; 369/252
[58] Field of Search ......................... 274/23 R, 23 A

[56] References Cited

U.S. PATENT DOCUMENTS

| 3,292,935 | 12/1966 | Cooper | 274/23 R |
| 3,731,938 | 5/1973 | Wren | 274/23 R |
| 4,066,267 | 1/1978 | Kagata | 274/23 R |

FOREIGN PATENT DOCUMENTS 2298153 8/1976 France ............................. 274/23 R Primary Examiner—Harry N. Haroian
Attorney, Agent, or Firm—Oblon, Fisher, Spivak, McClelland & Maier

[57] ABSTRACT

A pickup arm for use in phonographs or the like having a contactless inside-force cancelling device and/or a contactless stylus-force application device; the contactless inside-force cancelling device having a rotatable control magnet, a stationary control magnet, a cylindrical magnet fixed around the vertical pivot of the pickup arm, the rotatable and stationary control magnets combinedly forming a magnetic field in which the cylindrical magnet is rotatably placed, wherein rotation of the rotatable control magnet changes the magnetic flux density of the magnetic field to give the vertical pivot a torque sufficient to cancel the inside force of the stylus; the contactless stylus-force application device having a rotatable control magnet, a stationary control magnet, a cylindrical magnet fixedly provided on a horizontal axle fixed between the prongs of a forked end provided on the vertical pivot, the rotatable and stationary control magnets combinedly forming a magnetic field in which the cylindrical magnet is rotatably placed, wherein rotation of the rotatable control magnet changes the magnetic flux density of the magnetic field to give the vertical pivot a torque corresponding to the stylus force.

3 Claims, 17 Drawing Figures ic
PICKUP ARM

This is a continuation in part of application Ser. No. 932,616 filed 8/10/78 now abandoned.

BACKGROUND OF THE INVENTION

1. Field of the Invention

The present invention relates to a pickup arm or tone arm for use in phonographs or the like and, more particularly, to a pickup arm provided with an inside-force cancelling device and a stylus-force application device, both devices having a new and novel mechanisms for generating and controlling magnetic forces.

2. Description of the Prior Art

In reproducing the recorded sound from a record by the use of a pickup arm, the tip of the stylus is pulled in the direction tangent to the groove by a force f proportional to the stylus force. If the angle between the line connecting the vertical pivot of the pickup arm with the stylus point and the tangent to the groove is assumed to be $\phi$, a component of force $f' = f \tan \phi$ will act toward the center of the record. The component of force $f'$ is called the inside force. The inside force causes the stylus to laterally press the side walls of the grooves thereby deteriorating the quality of reproduction of the recorded sound.

The angle $\phi$ varies with the diameter of the groove. Therefore, the inside force also varies as the stylus point moves from the outside portion of the record toward the center thereof or as the pickup arm advances. In other words, the inside force is at a maximum when the stylus is at the outside portion of the record and decreases as the stylus approaches the center of the record as shown in FIG. 9. In order to cancel or eliminate the inside force, various technical means have been proposed to give the pivot of the pickup arm a torque having a characteristic curve opposite to that of the inside force. However, these inside-force cancelling means have some disadvantages. For instance, those with balance weights have a disadvantage in that they lose balance when the pivot of the pickup arm is placed obliquely. In other words, when the plane on which the pickup arm rotates is not horizontal, those with springs have a disadvantage in that it is difficult to obtain a repulsion performance sufficient to cope with close control, while those of the magnetic repulsion type are higher in repulsion performance than those of the above-mentioned type but not satisfactory.

Meanwhile, conventional means for controlling the stylus force which causes the occurrence of the inside force are usually divided into two types, namely static balance type and dynamic balance type. The static balance type means balance the weight of the arm containing the pickup cartridge with that of a counterweight. The dynamic balance type means utilize the repulsion of springs. These means, however, also have disadvantages similar to those mentioned hereinabove.

As is well known, the record is generally made of synthetic resin and, strictly speaking, is not uniform in thickness and therefore the stylus moves up and down while varying the stylus force. The smaller the stylus force, the smaller the inside force is. However, if the stylus force is too small, the stylus point cannot perfectly follow the wavy movement of the record surface. Therefore, it is required to provide a pickup arm mechanism that can keep the stylus force proper within the allowable limit.

The stylus-force application device of the present invention is of the dynamic balance type. The basic mechanism and principle on which it depends are similar to those of the inside-force cancelling device mentioned above.

This stylus-force application device is much superior in performance to the conventional device because such contains no resonant element such as a spring mechanism as in the conventional device which deteriorates the reproduced sound and can produce the stylus force by contactless means.

With this device, the stylus force may be closely controlled in an increment of about 10 mg. Accordingly, this device can achieve the so-called small-stylus-force control required for the high-speed rotation of the video disk record and can remarkably increase the service lives of the stylus and the record.

Therefore, the present invention is intended to eliminate the above-mentioned disadvantages of the prior art.

SUMMARY OF THE INVENTION

One object of the present invention is to provide a pickup arm which can perform contactless cancelling of the inside force.

Another object of the present invention is to provide a pickup arm which can control the stylus force closely, precisely and properly.

According to the present invention, there is provided a pick-up arm which has a contactless inside-force cancelling device and/or a contactless stylus-force application device. The inside-force cancelling device has a support member of ferromagnetic material low in residual magnetism and fixed on the base of a phonograph or the like, a rotatable control magnet fitted in the support member, a stationary control magnet fixed on the yoke, magnetic fluxes produced by the rotatable and stationary control magnets combinedly forming north and south poles at the ends of the support member to produce a magnetic field between the poles, a cylindrical magnet fixed around the vertical point of the pickup arm and rotatably fitted in the magnetic field, wherein rotation of the rotatable control magnet changes the magnetic flux density of the magnetic field to give the vertical pivot a torque approximate to and opposite in direction to a torque produced by the inside force of the stylus. The stylus-force application device has a support member of ferromagnetic material low in residual magnetism and fixed on the pickup arm, a rotatable control magnet fitted in the support member, a stationary control magnet fixed on the support member, magnetic fluxes produced by the rotatable and stationary control magnets combinedly forming north and south poles at the ends of support member to produce a magnetic field between the poles, a forked end provided on the vertical pivot and having a horizontal axle interconnecting the prongs thereof, and a cylindrical magnet fixed around the horizontal axle and rotatably fitted in the magnetic filed so as to make the support member vertically rotatable thereabout, wherein rotation of the rotatable control magnet changes the flux density of the magnetic field to give the pickup arm a torque corresponding to the stylus force.

BRIEF DESCRIPTION OF THE DRAWINGS

Various other objects, features and attendant advantages of the present invention will be more fully appreciated as the same becomes better understood from the following detailed description when considered in connection with the accompanying drawings in which like reference characters designate like or corresponding parts throughout the several views, and wherein.

DESCRIPTION OF THE PREFERRED EMBODIMENTS

Figure 1:
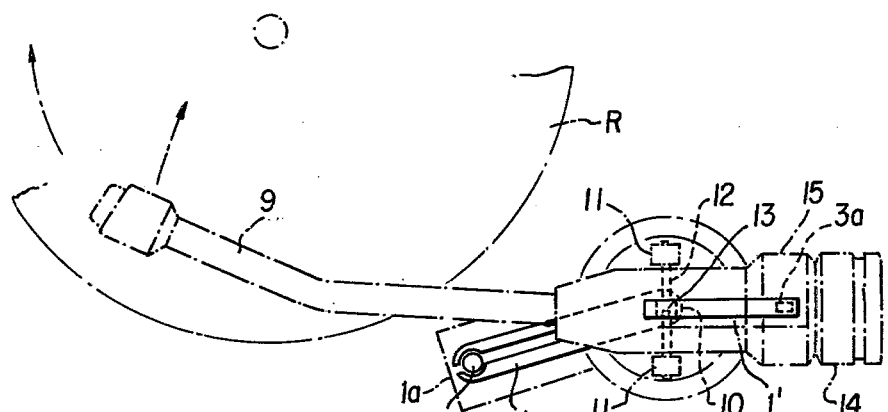
FIG. 1 is a plan view of a pickup arm according to a preferred embodiment of the present invention.

The present invention will be hereinafter described with reference to the accompanying drawings. The inside-force cancelling device will initially be explained in detail.

Reference numeral 1 designates a support member made of ferromagnetic material low in residual magnetism and consisting of a pair of spoon shaped frames disposed opposite to each other. The support member 1 is fixed on a base plate B of a phonograph. The support member includes at one end thereof a first curved section 2 in which a radially magnetized permanent magnet 3 (rotatable control magnet) is fitted, at its middle section parallel straight portions 5, 5 between which a laterally magnetized permanent bar magnet 4 (i.e. stationary control magnet) is longitudinally fixed, and at the other end a second curved section 6 having north (N) and south (S) poles 7 and 7' between which a magnetic field H is produced. The magnetic poles 7 and 7' are formed by the combined magnetic flux of the rotatable control magnet 3 and the stationary control magnet 4. In addition, a radially magnetized cylindrical permanent magnet 8 is fixed around the vertical pivot 10 of a pickup arm 9, being disposed horizontally rotatably in the magnetic field H.

With the above construction, if the rotatable control magnet 3 is rotated to change its N-S direction, the constant magnetic flux of the stationary control magnet 4 is combined with the varying magnetic flux of the rotatable control magnet 3 to change the magnetic flux density of the magnetic field H. Thus, it becomes possible to properly control the flux density of the magnetic field H.

Figure 5:
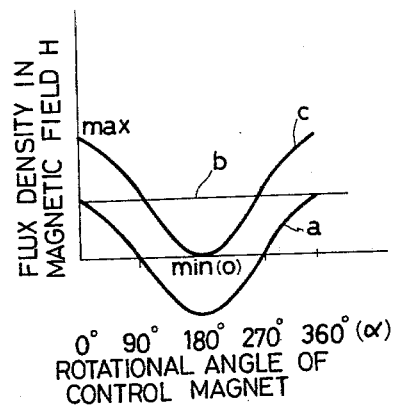
FIG. 5 is a diagram showing the relationship between the rotational angle α of the rotatable control magnet and the magnetic density of the magnetic field H.
Figure 6:
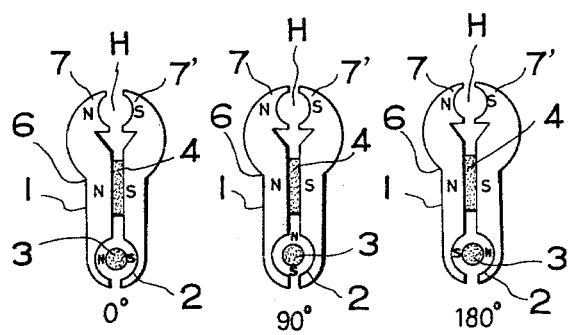
FIG. 6 is a schematical plan views of the yoke of the invention illustrating the rotatable magnet as it appears when the angle α assumes 0 deg., 90 deg., and 180 deg., respectively.
Figure 7:
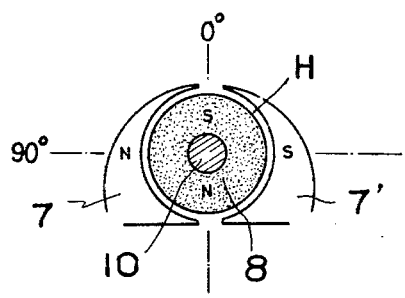
FIG. 7 is a plan view of the ends of the yoke and the cylindrical permanent magnet fixed on the vertical pivot of the pickup arm, illustrating the state where the magnet is placed in the magnetic field H.

FIG. 5 shows the relationship between the flux density of the magnetic field H and the rotational angle α of the rotatable control magnet 3. In FIG. 5, reference character "a" designates a flux density change curve obtained by changing the rotational angle α of the rotatable control magnet 3 in the range from 0 deg. to 360 deg.; "b" designates a line representing the constant magnetic flux density of the stationary magnet 4; and "c" designates a combined curve of the curve "a" and the line "b". In other words, as shown in FIG. 6, the flux density of the magnetic field H is controlled so that it is at a maximum when the rotational anlge α of the magnet 3 to 0 deg. and at a minimum (zero) when the angle α is 180 deg. In this manner, the magnetic field H is given a required field intensity according to the curve "c".

Figure 8:
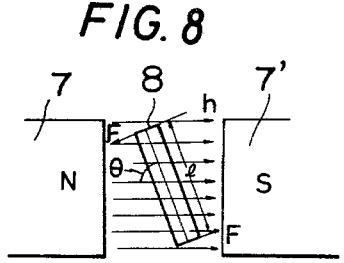
FIG. 8 is an explanatory view of the magnetic field H and its vicinities for explaining the principle on which a torque is produced on a magnet placed therein.

In FIG. 8, a force F=mh is exerted on both of the poles of the magnet 8. Thus, the magnet 8 placed in the magnetic field H is subjected to a torque T=Fl sin θ=mhl sin θ, where m is the strength of the poles of the magnet 8, h the intensity and direction of magnetic flux of the magnetic field H, l the distance between the N and S poles of the magnet 8, and θ the rotational angle of the magnet 8 or the vertical pivot 10 of the pickup arm 9 with respect to h. The torque T varies in proportion to h and θ, while m and l are constants.

The magnetic field intensity h is controlled, as mentioned above, by changing the rotational angle α of the rotatable control magnet 3 according to the curve "c" shown in FIG. 5. As seen from FIG. 8, the torque T is at a maximum when θ is 90 deg. and at a minimum when θ is 0 deg.

Figure 9:
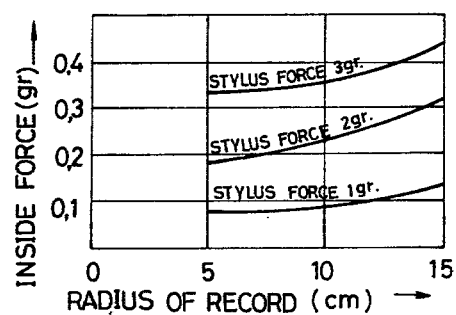
FIG. 9 is a diagram showing the relationship between the inside force and the position of the stylus on the record, the relationship being obtained by varying the stylus force.

The change curve of the torque may be made approximate to that of the inside force shown in FIG. 9. In other words, since the angles θ and φ change as the pickup arm 9 or the stylus moves from the outside of the record toward the center, it is possible to cancel the inside force f' by the torque T by making the torque T act in the direction opposite to the inside force f'.

Figure 10:
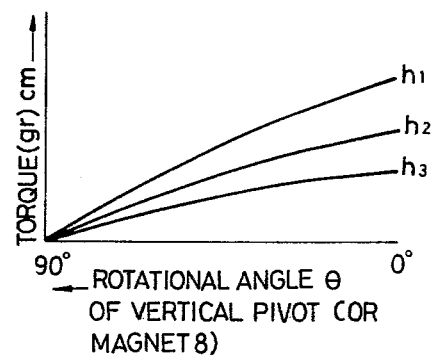
FIG. 10 is a diagram showing the relationship between the rotational angle θ of the vertical pivot of the pickup arm and the torque appearing on the magnet placed in the magnetic field H, the relationship being obtained by varying the intensity of the magnetic field H.

FIG. 10 shows the relationship between the torque T and the angle θ obtained by varying the magnetic field intensity h. Curves $h_1$, $h_2$ and $h_3$ correspond to the field intensity values of $h_1$, $h_2$ and $h_3$, respectively. The intensity h of the magnetic field H may be chosen according to the stylus force as shown in FIG. 9.

A preferred embodiment of this stylus-force application device will be described below with reference to the drawings.

Figure 4:
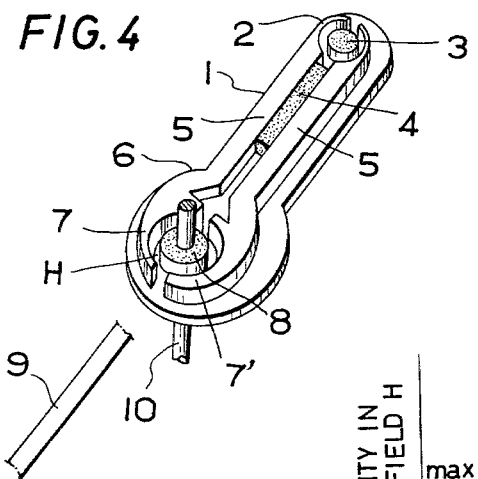
FIG. 4 is a schematical perspective view of a support member according to a preferred embodiment of the present invention.

A forked end 11 is formed on the top of the vertical pivot 10 of the pickup arm 9. A horizontal axle 12 is fixedly provided between and interconnects the prongs of the forked end 11. Reference numeral 13 designates a cylindrical permanent magnet fixed around the horizontal axle 12. A second support similar in construction to the support member 1 shown in FIG. 4 is fitted, at its curved section corresponding to the poles 7 and 7' of the support member 1, around the magnet 13 so that it may be vertically rotatable. The pickup arm 9 and a balance weight 14 are fixed to the front and rear of the second support member, respectively. The second support member may be operated in the same manner as the support member 1. Thus the second support member is given a torque so that it may be vertically rotated about the magnet 13 thereby controlling the stylus force. With this devide, the stylus force may be controlled within a sufficiently wide range and may be adjusted very closely, precisely and correctly. A knob 15 is provided for changing, by its rotation, the angle of the N-S direction of the rotatable control magnet 3 within the range from 0 deg. to 180 deg. so as to produce a torque ranging from zero to a maximum thereby setting a proper value of the stylus force. Reference numeral 16 designates a calibration for indicating the rotational angle of the rotatable control magnet.

FIGS. 1–3 and 11–17 serve to illustrate the definition of angle $\phi$, the structural features of the contactless inside-force cancelling device and the contactless stylus-force application device.

Figure 11:
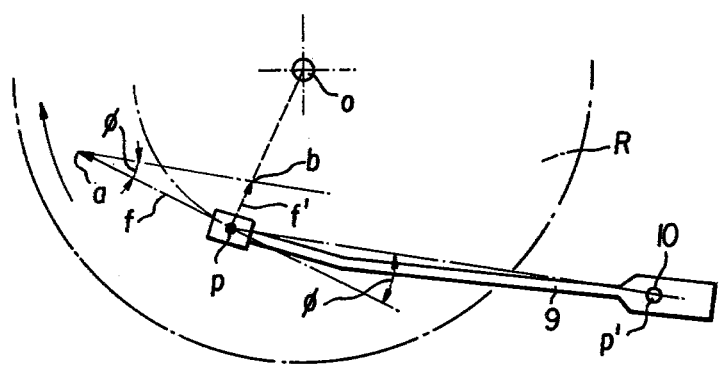
FIG. 11 serves to illustrate the operation of the present invention.

The definition of angle $\phi$ will be hereinafter explained with reference to FIG. 11. In FIG. 11:

R ... Record
1 ... Groove
o ... Rotational axis of the record
9 ... Tone arm
10 ... Rotational axis of the tone arm
P ... Tip of stylus
P' ... Center of the rotational axis 10 of the tone arm 9
Line Pa ... Tangent of the groove 1 at the point of P
$\phi$ ..... Angle between the tangent Pa and the line PP'

If the record R is rotated in the direction of the arrow, the tip of the stylus P is pulled in the direction of the tangent Pa by the force f=Pa. As a result, the tip of the stylus P is pulled in the direction of PO by the force f'=Pb=f tan $\phi$. The force f' is called the inside force.

Figure 17:
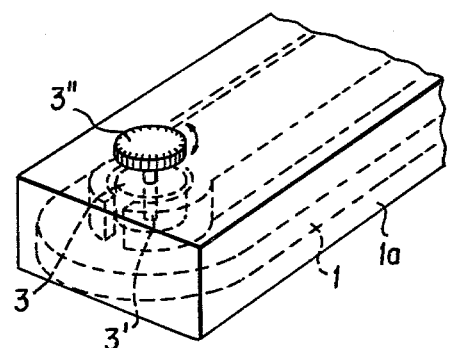
FIGS. 16 and 17 show the manner in which the magnet is supported and controlled.
Figure 16:
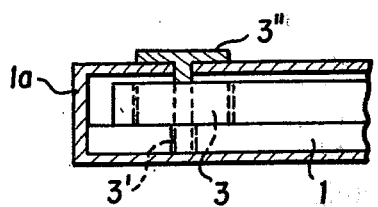

FIGS. 1, 2, 16 and 17 show the manner in which magnet 3 is supported and controlled. The support member 1 of the contactless inside-force cancelling device is mounted within a casing 1a fixed to a bsse B. As shown in FIGS. 16 and 17, the support 1 includes a curved section in which the control magnet 3 is fitted. The control magnet 3 is fixed to a vertical pivot 3' and rotatably supported within the casing 1a. The vertical pivot 3' includes a control knob 3" at the upper end thereof for manually rotating the control magnet 3 in the curved section of the support member 1, thereby controlling a flux density of magnetic field H where a cylindrical magnet 8 fixed to a vertical pivot 10 of a pick up arm 9 is disposed to give the vertical pivot a torque sufficient to cancel an inside force of stylus. Accordingly, the control magnet 3 does not rotate as the arm 9 rotates, while the cylindrical magnet 8 fixed to the vertical pivot 10 of the pickup arm 9 rotates in the magnetic field H as the arm 9 rotates.

Figure 2:
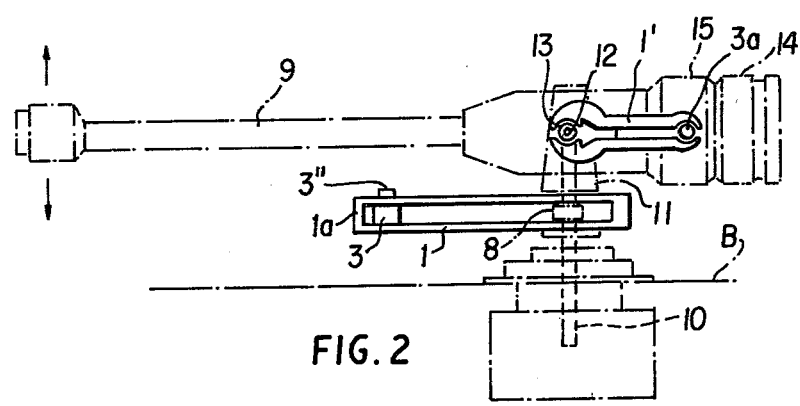
FIG. 2 is a side view thereof.
Figure 3:
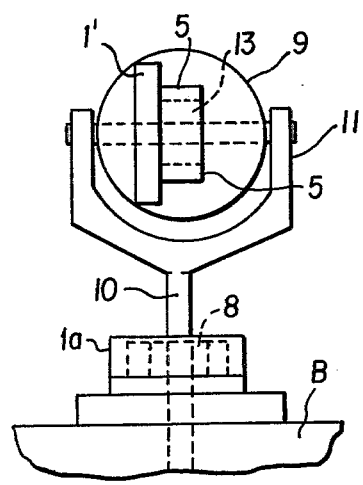
FIG. 3 is a schematic side view of the vertical pivot of the pickup arm according to the present invention.

A second support member 1' of the contactless stylus-force application device is similar in construction to the support member 1 of the inside-force cancelling device. The support member of the stylus-force application device is fixedly mounted within a pickup arm 9 as shown in FIGS. 1, 2, and 3. The support member 1, is disposed in the pickup arm 9 perpendicular to the support member 1 of the inside-force cancelling device as shown in FIG. 2, and is vertically rotatable around cylindrical magnet 13 (corresponding to the cylindrical magnet 8) fixed around horizontal axle 12 (corresponding to the vertical pivot 10) together with the pickup arm 9. In the stylus-force application device, the horizontal axle 12 and the cylindrical magnet 13 are stationary, while the support member 1' is vertically movable with the pickup arm 9. The flux density of magnetic field H where the cylindrical magnet 13 is disposed can be controlled by rotatable control magnet 3a (corresponding to the magnet 3 of the inside-force cancelling device) with a knob 15 so that the support member 1' may be given a torque to vertically move the pickup arm 9 for controlling the stylus force.

Figure 12:
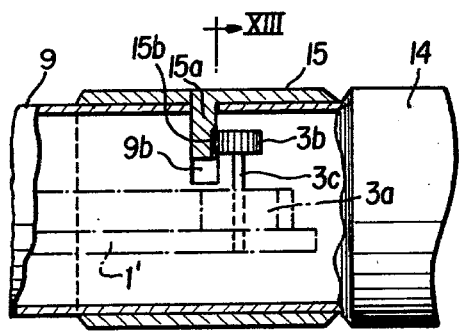
FIGS. 12–15 illustrate the rotating mechansim for the magnet of the present invention.
Figure 13:
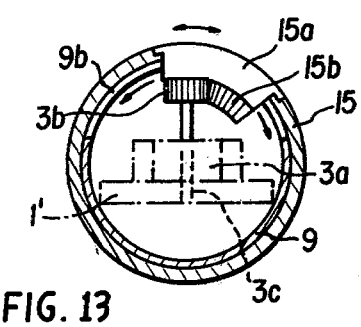
Figure 14:
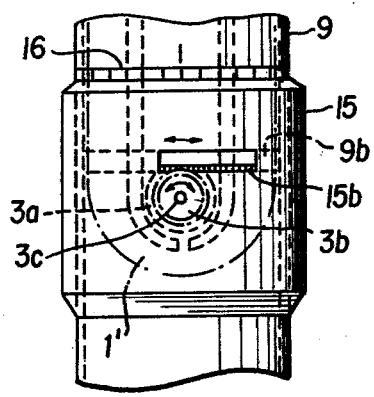
Figure 15:
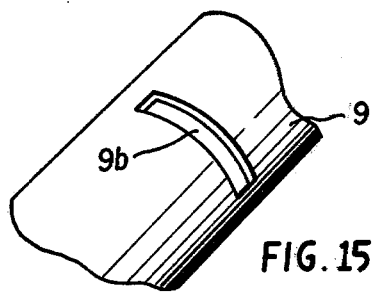

FIGS. 12–15 show an example of a rotating mechanism for the magnet 3a of the stylus-force application device. As shown in FIGS. 12–13, the magnet 3a is fixed to an axle 3c which is rotatably supported by the support member 1'. The axle 3c is provided with a gear 3b at an end thereof. The knob 15 includes a plate 15a in the shape of arc which extends to the inside of the pickup arm 9 through a slit 9b provided on the pickup arm 9. The plate 15a is provided with teeth 15b on its side surface which engages with the gear 3b. When the knob 15 is rotated, the plate 15a moves along the slit 9b which, in turn, rotates the gear 3b and the magnet 3a.

It will be understood from the foregoing description that the present invention can achieve cancellation of the inside force in a contactless fashion, and can maintain the stylus force at proper values and can control the same closely and correctly. Thus the present invention can produce excellent effects on the quality of reproduction of the recorded sound.

Obviously, many modifications and variations of the present invention are possible in light of the above teachings. It is therefore to be understood that within the scope of the appended claims, the invention may be practiced otherwise than as specifically described.

What is claimed as new and desired to be secured by Letters Patent of the United States is:

1. A pickup arm having at one end thereof a pickup equipped with a stylus, which comprises:
    a base;
    a vertical pivot member rotatably supporting said pickup arm for movement in a horizontal plane and supported by said base;
    a support member made of ferromagnetic material low in residual magnetism and fixed on said base;
    a rotatable control magnet fitted in said support member, a stationary control magnet fixed on said support member, magnetic fluxes produced by said rotatable and stationary control magnets combinedly forming north and south poles at the ends of said support member to produce a magnetic field between said poles, and
    a cylindrical magnet mounted to said vertical pivot and rotatably fitted in said magnetic field, wherein rotation of said rotatable control magnetic changes the magnetic flux density of said magnetic field in the range from zero to a maximum to give said vertical pivot a torque approximate to and opposite in direction to a torque produced by the inside force of said stylus.

2. A pickup arm having at one end thereof a pickup equipped with a stylus, which comprises:
    a base;
    a vertical pivot mounting said pickup arm for horizontal movement and supported by said base;
    a support member made of ferromagnetic material low in residual magnetism and fixed on said pickup arm, a rotatable control magnet fitted in said support member, a stationary control magnet fixed on said support member, magnetic fluxes produced by said rotatable and stationary control magnets combinedly forming north and south poles at the ends of said support member to produce a magnetic field between said poles, a forked end provided on said vertical pivot and having a horizontal axle interconnecting the prongs thereof and, a cylindrical magnet mounted on said horizontal axle and rotatably fitted in said magnetic field so as to make said support member vertically rotatably thereabout, wherein rotation of said rotatable control magnet changes the magnetic flux density of said magnetic field in the range from zero to a maximum to give said pickup arm a torque corresponding to the stylus force of said stylus.

3. A pickup arm having at one end thereof a pickup equipped with a stylus, which comprises:

a base;

a vertical pivot mounting said pickup arm for horizontal movement in a horizontal plane and supported by said base;

a first support member made of ferromagnetic material low in residual magnetism and fixed on said base, a first rotatable control magnet fitted in said first support member, a first stationary control magnet fixed on said first member, magnetic fluxes produced by said first rotatable and stationary control magnets combinedly forming north and south poles at the ends of said first support member to produce a first magnetic field between said first poles, a cylindrical magnet fixed around said vertical pivot and rotatably fitted in said first magnetic field, a second support member made of ferromagnetic material low in residual magnetism and fixed on said pickup arm, a second rotatable control magnet fitted in said second support member, a second stationary control magnet fixed on said second support member, magnetic fluxes produced by said second rotatable and stationary control magnets combinedly forming north and south poles at the ends of said second support member to produce a second magnetic field between said poles, a forked end provided on said vertical pivot and having a horizontal axle interconnecting the prongs thereof, and a cylindrical magnet fixed around said horizontal axle and rotatably fitted in said second magnetic field so as to make said second support member vertically rotatable thereabout, wherein rotation of said first rotatable control magnet changes the magnetic flux density of said first magnetic field in the range from zero to a maximum to give said vertical pivot a torque approximate to and opposite in direction to a torque produced by the inside force of said stylus, and wherein rotation of said second rotatable control magnet changes the magnetic flux density of said second magnetic field in the range from zero to a maximum to give said pickup arm a torque corresponding to the stylus force of said stylus.

* * * * *